US006979705B2

(12) United States Patent
McDowell et al.

(10) Patent No.: US 6,979,705 B2
(45) Date of Patent: Dec. 27, 2005

(54) WATER BASED COAL TAR EMULSIONS

(75) Inventors: Donald L. McDowell, Geneva, OH (US); Kenneth J. Brzozowski, Chardon, OH (US); Joseph F. Duda, North Olmstead, OH (US); Brian D. D'Anza, Hudson, OH (US)

(73) Assignee: W.P. Hickman Systems Inc., Solon, OH (US)

(*) Notice: Subject to any disclaimer, the term of this patent is extended or adjusted under 35 U.S.C. 154(b) by 0 days.

(21) Appl. No.: 10/796,258

(22) Filed: Mar. 9, 2004

(65) Prior Publication Data
US 2005/0203220 A1     Sep. 15, 2005

(51) Int. Cl.$^7$ ............................................ C09D 195/00
(52) U.S. Cl. ........................................ 524/66; 106/277
(58) Field of Search ........................... 106/277; 524/66

(56) References Cited

U.S. PATENT DOCUMENTS

| | | | | |
|---|---|---|---|---|
| 2,509,777 | A | 5/1950 | McMillan | 260/28.5 |
| 2,537,190 | A | 1/1951 | Lankau | 260/28.5 |
| 2,807,596 | A | 9/1957 | Flickinger | 260/28.5 |
| 3,027,342 | A | 3/1962 | Kemp et al. | 260/28.5 |
| 3,296,165 | A | 1/1967 | Kemp | 260/28.5 |
| 3,493,408 | A * | 2/1970 | Drukker | 106/277 |
| 3,497,371 | A | 2/1970 | Chang | 106/277 |
| 3,567,476 | A * | 3/1971 | Masciantanio et al. | 106/277 |
| 3,835,117 | A | 9/1974 | Wakaschek | 260/28.5 |
| 3,897,380 | A | 7/1975 | Walaschek | 260/28.5 |
| 4,266,885 | A | 5/1981 | Naito et al. | 405/109 |
| 4,731,399 | A | 3/1988 | Fitzgerald et al. | 524/60 |
| 5,116,420 | A | 5/1992 | Schneider et al. | 106/640 |
| 5,236,500 | A | 8/1993 | Schneider et al. | 106/640 |
| 5,969,013 | A | 10/1999 | Brzozowski et al. | 524/66 |
| 6,110,846 | A | 8/2000 | Brzozowski et al. | 442/85 |
| 6,127,292 | A | 10/2000 | Brzozowski et al. | 442/164 |
| 6,300,394 | B1 * | 10/2001 | Fensel et al. | 524/66 |
| 6,360,511 | B1 | 3/2002 | Brzozowski et al. | 52/746.11 |

FOREIGN PATENT DOCUMENTS

| | | |
|---|---|---|
| DD | 258918 | 4/1986 |
| DE | 3 710 405 | 3/1987 |
| EP | 561472 | 3/1993 |
| GB | 638507 | 1/1947 |

OTHER PUBLICATIONS

Engineering Brief #35, Thermoplastic Coal-Tar Emulsion Slurry Seal; Apr. 14, 1986; pp. 1-6.
GB0500082.3; Search Report under Section 17 dated May 10, 2005.

* cited by examiner

*Primary Examiner*—David Brunsman
(74) *Attorney, Agent, or Firm*—Renner, Otto, Boisselle & Sklar, LLP

(57) ABSTRACT

Water-based coal tar emulsions are described which are prepared from a blend comprising coal tar, water, acrylonitrile-butadiene copolymer powders and clay. After the emulsion is prepared from the blend, a rubber latex may be added to the emulsion. Films obtained from the emulsions exhibit desirable elongation and tensile properties.

39 Claims, No Drawings

WATER BASED COAL TAR EMULSIONS

FIELD OF THE INVENTION

The present invention relates to water based coal tar emulsions and methods. More particularly the invention relates to water based coal tar emulsions particularly useful as waterproof coatings on built-up roofing systems for flat or low pitched roofs.

BACKGROUND OF THE INVENTION

Built-up roofing (BUR) systems generally comprise a substantially rigid deck covered with a membrane comprising multiple layers of bitumen impregnated felt having a separately applied coating of bitumen on top of each layer of felt with a protective layer of small stones or other inert mineral aggregate materials embedded in and covering the top bitumen coating. BUR is used primarily on commercial buildings which have flat or low-slope roofing systems. Its popularity arises from its relatively low cost combined with its effectiveness as a water repellant membrane and its durability.

Bituminous materials, especially asphalt and coal tars, have been utilized as roofing materials particularly in built-up roofing applications, as road paving materials, and as adhesive materials. However, such materials tend to deteriorate under conditions of extreme temperature variations, constant exposure to physical stress, and environmental weathering. Various proposals have been made in the art to modify the bituminous materials to overcome these deficiencies.

Although asphalt and coal tar have a similar appearance when in a package or in a finished roof, they are derived from different raw materials, and they are also different in their chemistry. Coal tar and asphalt generally are incompatible. Coal tar is obtained by heating bituminous coal to very high temperatures and collecting the volatile materials that are produced. These volatiles are referred to as crude coke oven tar, and the solid residue left behind is called coke. The crude coke oven tar is processed to recover a variety of materials including creosote and precursors for a large number of other important chemicals. The residue left after this processing step is called coal tar pitch which comprises primarily aromatic hydrocarbons. The coal tar pitch is the material used in the more familiar applications of roofing and asphalt concrete surface treating.

Asphalt, on the other hand, is derived from petroleum or crude oil and comprises primarily aliphatic hydrocarbons. Crude oil is processed at a refinery by distilling off the "light ends" to produce materials such as propane, gasoline, fuel oils, and chemical intermediates. The residue that remains from the distillation is referred to as straight-run asphalt. Straight run asphalt is processed primarily for road paving applications, and after further processing (e.g., oxidation or blowing), it is converted to roofing asphalts designated as D312 Types I through IV, by the American Society for Testing and Materials (ASTM).

Bituminous coatings are advantageously handled as aqueous emulsions since health and safety issues may be involved when volatile and combustible organic solvents are used in bituminous coatings. Water based coal tar emulsions have been described in the prior art as useful in preparing protective coatings. In its most common form, an aqueous coal tar emulsion comprises an emulsion of a coal tar in an aqueous medium with an emulsifying or dispersing agent such as an organic soap or detergent and/or an inorganic colloid such as a particulate clay. A conventional practice in the protective coating art is to brush, spray or paint the articles with an aqueous emulsion of coal tar. When the coating of coal tar dries on the article, it provides a protective film. Such films, however, have certain disadvantages such as being attacked by various solvents, being soft, and having inadequate elongation, ductility or tensile strength. It has been proposed to improve these properties by including various additives into the emulsions.

SUMMARY OF THE INVENTION

In one embodiment, this invention relates to a water-based coal tar emulsion which is prepared from a blend comprising, based on the total weight of the emulsion,
(a) from about 20% to about 60% by weight of coal tar;
(b) from about 30% to about 60% by weight of water;
(c) from about 3% to about 15% by weight of a acrylonitrile-butadiene copolymer powder; and
(d) from about 10% to about 30% by weight of clay.

In another embodiment, the invention relates to a method of preparing water-based coal tar emulsions which comprises
(a) preparing a first mixture comprising coal tar and at least one acrylonitrile-butadiene copolymer powder;
(b) heating the mixture to a temperature of at least about 160° C.;
(c) preparing a second mixture comprising water and clay;
(d) heating the second mixture to a temperature of at least about 45° C.; and
(e) adding the first mixture to the second mixture with agitation to form an emulsion.

In one embodiment a rubber latex is added to the emulsions.

The water based coal tar emulsions of the invention are useful particularly as roofing, waterproofing and maintenance materials. More particularly, the water based coal tar compositions are useful as primers and as a waterproof coating for flat roofs and particularly as a waterproof coating over built-up roofing (BUR) applications. The coatings formed from the coal tar compositions of the invention exhibit improved tensile, elongation and recovery characteristics.

DESCRIPTION OF THE INVENTION

The present invention is directed to water based coal tar emulsions prepared from a blend of materials comprising coal tar, an acrylonitrile-butadiene copolymer powder, water, and clay.

In one embodiment of the invention the coal tar which is utilized in the coal tar emulsion is a coal tar having a float test of from about 50 seconds to about 220 seconds as determined by ASTM Test D139 entitled Test Method for Float Test for Bituminous Materials which is commonly used for testing the viscosity of semi-solid bituminous material. Such coal tars are of the types conventionally designated as RT-7 to RT-12 coal tars. In one embodiment, the coal tars with the higher viscosity ranges such as RT-11 and RT-12 coal tars are used, and the most useful coal tar at the present time is the RT-12 coal tar. RT11 has a float test of 100 to 150 seconds at 50° C., and RT12 has a float test of 150–220 seconds at 50° C. The RT-11 and RT-12 coal tars have a minimum specific gravity at 25/25° C. of 1.16. The coal tars used to prepare the emulsions of the invention also include those coal tars conventionally designated as RT-5 and RT-6 which are characterized as having an Engler 50 mL viscosity at 50° C. (122° F.) of from 17 to 26 and 26 to 40, respectively. The standard specification for these and other road tars is found in ASTM D490-92.

In one embodiment the amount of coal tar included in the blends used to prepare the emulsions of the invention may range from about 20% to about 60% by weight based on the total weight of said emulsion. In another embodiment, the amount of coal tar in the emulsion is from about 20% to about 50% based on the weight of the emulsion.

In one embodiment, up to about 35 parts by weight of the coal tar normally present in the blend can be replaced by coal tars designated by ASTM D450, Types I and III. These have respective softening points (ASTM D36) of 52° C. to 60° C. and 56° C. to 64° C.

Another ingredient of the blend used to prepare the coal tar emulsions is a copolymer of an acrylonitrile and 1,3-butadiene. The copolymers used to prepare the blend are in powder form. In one embodiment, the emulsion will contain from about 3% to about 15% by weight of the acrylonitrile copolymer powder based on the total weight of the emulsion. In another embodiment, the emulsion may contain from 5% to about 15% by weight of the copolymer powder or even from about 7% to about 15% by weight of the copolymer powder. In yet another embodiment, the emulsion may contain from about 15% to about 40% by weight of the copolymer based on the weight of the coal tar present in the emulsion. In another embodiment, the emulsion may contain from about 25% to about 40% by weight of the copolymer based on the weight of the coal tar in the emulsion.

Generally, the copolymer will be comprised of a major amount of butadiene and a minor amount of the acrylonitrile. Minor amounts of other monomers may also be present, but the copolymers are preferred. The acrylonitrile content of the copolymer may range from about 20% to about 40 or 45% by weight, although in one embodiment, the acrylonitrile content of the copolymer is between about 25% to about 35% by weight. As the acrylonitrile content increases, it becomes increasingly more difficult to dissolve the copolymer in the tar. Blends of two or more acrylonitrile copolymers also can be utilized to provide coal tar emulsions having the desired properties. The acrylonitrile-butadiene copolymers may be linear copolymers or crosslinked copolymers. In one embodiment the blend comprises a mixture of a linear copolymer and a crosslinked copolymer. When a mixture of copolymers is utilized, the copolymer mixture may comprise a major amount of the linear copolymer and a minor amount of a crosslinked copolymer. Thus, in one embodiment, the copolymer mixture will contain from about 60% to about 100% by weight of a linear copolymer powder and from 0% to about 40% of a crosslinked copolymer powder. In another embodiment, the blend comprises a copolymer mixture comprising from about 60% to about 95% by weight of the linear copolymer and from about 5 to about 40% by weight of the crosslinked copolymer. In yet another embodiment, the copolymer mixture comprises from 60% to about 85% by weight of the linear copolymer and from about 15 to about 40% by weight of the crosslinked copolymer.

The acrylonitrile-butadiene copolymer powders may contain other materials such as partitioning agents. Examples of useful partitioning agents include polyvinyl chloride and inorganic materials such as powdered calcium carbonate. The amount of partitioning agent present in the acrylonitrile-butadiene copolymers may vary over a wide range although in one embodiment the amount of partitioning agent is within the range of from about 5 to about 15% by weight.

Useful acrylonitrile-butadiene copolymer powders are available commercially from, for example, Eliokem Inc., Akron, Ohio under the general trade designation Chemigum, and Zeon Chemicals Inc., Louisville, Ky. under the general trade designation Nipol.

Examples of acrylonitrile-butadiene copolymer powders which are commercially available from Eliokem include linear copolymers as well as crosslinked copolymers. A specific example of a linear acrylonitrile-butadiene copolymer powders available from Eliokem include Chemigum P615D. Specific examples of crosslinked acrylonitrile-butadiene copolymer powders available from Eliokem include Chemigum P8BA, Chemigum P8D, Chemigum P-83 and Chemigum P-86F. The P83 and P8BA are partitioned with PVC, whereas the powders P86F, P615D, and P8D are partitioned with calcium carbonate. In addition, the P83, P86F, and P615D copolymer powders are characterized by Eliokem as cold polymerized, and the P8D and P8BA copolymers are characterized as hot polymerized.

The water based coal tar emulsions of the present invention also contain clay. In one embodiment, the emulsions contain from about 5% to about 30% by weight of clay based upon the total weight of the emulsion. In another embodiment, the emulsions may contain from about 10 to about 30% by weight of clay based upon the total weight of the emulsion.

A variety of clays can be utilized in the emulsions of the present invention. In one embodiment, the clays may be acidic clays or neutral clays. Examples of useful active clays include ball clays, china clays, fire clays and kaolin clays. These clays have a tendency to coat the bitumen particles and thereby support or stabilize the emulsion. Useful active clays are available from a variety of sources including the Kentucky-Tennessee Clay Company of Mayfield, Ky. and the Old Hickory Clay Company of Hickory, Ky.

In addition to the supporting clays described above, the emulsions may also contain an emulser type active clay filler such as those clays containing at least 40% montmorillonite such as the medium and high grade bentonites. Other fillers may be included in the emulsions in addition to the active clay fillers even though such fillers may not function as emulsifiers or emulsion stabilizers. Examples of non-active clay fillers include high silica clays and high illite clays. Examples of typical non-clay fillers which may be included in the emulsions even though they may not contribute to emulsion formation or stability include asbestos, ground soap stone or lime stone, carbon black, barytes, slate, flour and powdered tile.

In one embodiment, the clay which is utilized in the emulsions of the present invention is a ball clay which is mainly kaolinite. Examples of commercially available ball clays which are useful in the emulsions of the present invention include Volunteer clay which is an example of an acid ball clay available from the Old Hickory Clay Co., and M&D clay which is an example of a neutral ball clay from Kentucky-Tennessee Clay Co. The Volunteer clay provides a clay slip having a pH in the range of about 3 to about 4, and the M&D clay provides a clay slip having a pH of from about 6.5 to about 7.5.

The water based coal tar emulsions of the present invention also contain significant amounts of water. In one embodiment, the emulsion of the invention may contain from about 30% to about 60% by weight of water. When the emulsion is to be utilized as a primer, the emulsion will contain water in amounts of from about 40 or about 50% up to about 60% by weight based upon the total weight of the emulsion, and lesser amounts of the acrylonitrile-butadiene copolymer powder and the clay.

Various materials may be added to the coal tar emulsions of the present invention to improve one or more properties of the emulsions. For example, plasticizers, antioxidants, antifreeze materials, stabilizers, etc. may be included in the emulsions of the present invention.

In one embodiment, the emulsions may contain up to about 10% by weight of one or more plasticizers. In another embodiment, the emulsions may contain from about 0.1 to about 10% by weight of one or more plasticizers. A wide variety of plasticizers may be utilized in the emulsions of the present invention, and included among these, are ester plasticizers derived from a diacid or an anhydride and a suitable alcohol having from 1 to about 13 carbon atoms. Useful ester plasticizers include phthalates, adipates, sebacates, phosphates, benzoates and trimellitates. Phthalate ester plasticizers may be utilized in the emulsions of the present invention and these include phthalic acid esters of alcohols containing from, for example, 1 to 12 or more carbon atoms. Specific examples of useful plasticizers include dioctyl phthlate (DOP), dioctyl adipate (DOA), trioctyl trimellilate (TDTM), diethyl phthalate (DEP), dioctyl terephthalate ester (DOTP), dimethyl phthalate (DMP), dibutyl phthalate (DBP), triethylene glycol di-2-ethylhexoate (TEG-EH) glyceryl triacetate, 2,2,4-trimethyl-1,3-pentanediol diisobutyrate plasticizer (TX1 B), dipropylene glycol benzoate, and DINP. Paraplex A-9000, a plasticizer comprising a mixture of diisononyl phthalate (<45%) and a polyester phthalate available from the E. P. Hall Co. also may be utilized. Another useful plasticizer is KP140 plasticizer which is a tributoxyethyl phosphate available from Great Lakes Chemical Corp.

The emulsions of the present invention also may contain an antioxidant, and in one embodiment, the emulsions contain from about 0.1 to about 2% by weight of an antioxidant. A variety of antioxidants can be utilized including hindered phenolic antioxidants which are known in the art and are described in, for example, U.S. Pat. No. 4,721,531, columns 13–14. U.S. Pat. No. 4,721,531 is hereby incorporated by reference for its disclosure such hindered phenolic antioxidant compounds. Hindered phenolic antioxidant compounds are available commercially such as from Ciba-Geigy under the trade designations "Irganox" and "Tinuvin". Specific examples include Irganox 1076 which is believed to be n-ocyl decyl-3-(3'5'-di-t-butyl-4'-hydroxy phenyl) propanoate, Irganox 1010 which is a highly substituted hydroxy benzene propanoate, etc. Hindered phenolic antioxidants also are available from Eliokem under the general trade designation Wingstay. Specific examples of antioxidants available from Eliokem include Wingstay L, Wingstay S, SN-1 and Wingstay L. Other useful commercially available antioxidants include Vanox ZMTI (from R. T. Vanderbilt) Flectol TMQ (available from Flexsys) and Perkacit ZDBC (available from Flexsys).

The water based coal tar emulsions of the present invention also may contain one or more antifreeze additives. In one embodiment, the antifreeze additives which are included in the emulsions of the present invention include organic hydroxy and organic polyhydroxy compounds including polyoxyalkylene polyols. Examples of such hydroxy compounds include ethanol, propanol, etc, and examples of polyhydroxy compounds include ethylene glycol, propylene glycol, hexylene glycol, and glycol ethers such as diethylene glycol, dipropylene glycol, etc. In one embodiment, the emulsions may contain from about 1 to about 10% or more of the antifreeze additive.

In another embodiment, the emulsions may also contain one or more stabilizers or thickeners. Inorganic clay thickeners may be utilized including smectite clays, mortmorillonite clays, hectorite clays, bentonite clays, etc. Colloidal or hydrated magnesium aluminum silicates are available commercially from, for example, R. T. Vanderbilt under the trade designations Veegum and VanGel.

In yet another embodiment of the present invention, the emulsions also may contain aluminum powder in amounts ranging up to about 8% by weight based on the total weight of the emulsion. In another embodiment, the emulsions may contain from about 1 to about 8% by weight of aluminum powder. The aluminum powder which is incorporated into the emulsions of the present invention may be an aluminum metal powder product wherein the particles are essentially in flake form, although the aluminum may be added in other mesh sizes. An example of a useful aluminum product which can be included in the emulsions of the present invention is SDF Hydrocoat NP547 available from Eckart America L.P.

As mentioned above, the water based coal tar emulsions useful in the present invention are prepared from a blend comprising coal tar, water, an acrylonitrile-butadiene copolymer powder, and clay. In one embodiment, the emulsions of the present invention are prepared by the method which comprises (a) preparing a first mixture, (oil phase) comprising coal tar and at least one acrylonitrile-butadiene copolymer powder;

(b) heating the mixture to a temperature of at least about 160° C.;

(c) preparing a second mixture (clay slip) comprising water and clay;

(d) heating the second mixture to a temperature of at least about 45° C.;

(e) adding the first mixture to the second mixture with agitation to form the desired emulsion.

In another embodiment, at least a portion of the acrylonitrile-butadiene copolymer powder is first predispersed in at least one plasticizer, and the predispersed mixture is then blended with the coal tar. It has been observed that when the copolymer powders are predispersed in a plasticizer which is then blended into the coal tar, the tendency of the plasticizer to migrate to the surface of the films obtained from the emulsions of the invention is decreased.

In another embodiment, a portion of the acrylonitrile-butadiene copolymer powder is mixed with the coal tar which is then heated to an elevated temperature such as about 160° C. whereupon the remainder of the acrylonitrile-butadiene copolymer is added to the mixture. When more than one acrylonitrile-butadiene copolymer powder is utilized in the emulsions, one or more of the copolymer powders may be predispersed in a plasticizer. When an antioxidant is to be included in the emulsions of the present invention, it is generally introduced into the first mixture which is the mixture of coal tar and the acrylonitrile-butadiene copolymer powders.

Thus, in one embodiment, the water based coal tar emulsion of the invention may be prepared by a method which comprises:

(a) preparing a first mixture comprising from about 35 to about 60 parts by weight of coal tar and from about 6.5 to about 18 parts by weight of at least one acrylonitrile-butadiene copolymer powder;

(b) heating the mixture to a temperature of at least about 160° C.;

(c) preparing a second mixture comprising from about 45 to about 60 parts by weight of water and from about 15 to about 19 parts by weight of ball clay;

(d) heating the second mixture to a temperature of at least about 45° C.; and (e) adding the first mixture to the second mixture with agitation to form an emulsion.

In other embodiments, one or more of the following may also occur: adding from about 5 parts to about 10 parts by weight of a rubber latex to the emulsion formed in (e); adding 0.2 to about 1.5 parts by weight of an antioxidant and/or about 4 to 10 parts by weight of a plasticizer to the first mixture; and adding from about 3 to 5 parts by weight of an antifreeze material to the second mixture prepared in (c) or to the emulsion formed in (e). In another embodiment, the plasticizer may be added after the emulsion is formed. However, it has been observed that there is less tendency for the plasticizer to migrate to the surface of the film over time when the plasticizer is introduced into the oil phase, and more often, when at least a portion of the acrylonitrile-butadiene copolymer powder is predispersed in the plasticizer and the predispersion is added to the oil phase.

The method of the present invention may be illustrated by the following detailed procedure. In a first mixer (e.g., a high shear mixing apparatus) there is added the coal tar followed by a predispersion of a crosslinked acrylonitrile-butadiene copolymer powder in DOP. Additional crosslinked copolymer powder and a linear acrylonitrile-butadiene copolymer powder are then added to the mixer with agitation until the mixture is smooth. This mixture is then heated to a temperature of at least 160° C. whereupon additional linear copolymer powder is added. In a second mixer, a mixture of water and clay is prepared and heated to a temperature of about 45° C., and the second mixture is then added slowly to the first mixture with agitation until an emulsion is formed. If desired, the antifreeze material (e.g., propylene glycol) can be added and mixed into the emulsion.

In one embodiment of the present invention it has been found to be desirable to add a rubber latex to the emulsions described above. It has been observed that the addition of a rubber latex after formation of the above described emulsions results in the formation of a film having improved tensile and elongation properties. The amount of rubber latex included in the emulsion may range from 0% to about 25% or about 30% by weight based on the total weight of the emulsion. In another embodiment the emulsions may contain from about 0.5 to about 25% by weight of the rubber latex, and in yet another embodiment, from about 1% to about 15% by weight.

A variety of rubber latices may be utilized in the emulsions of the present invention. Natural and synthetic rubber latices may be used, and examples include natural rubber, ethylene and propylene polymers and copolymers, polyisoprene, copolymers of isobutylene and isoprene or butadiene, chlorinated rubbers, styrene-butadiene, acrylonitrile-butadienes, and butadiene-styrene-acrylonitrile terpolymers. The rubber latices added to the emulsions generally contain from about 20 to about 80% by weight of solids.

In one embodiment, the latex is an acrylonitrile-butadiene latex which has excellent compatibility with the coal tar and is effective in improving the elongation of the films obtained with the emulsions of the invention. Suitable acrylonitrile-butadiene latices for emulsions of the invention include those manufactured by Eliokem and which are sold under the trade designations "Chemigum Latex" such as Chemigum Latex 248.

The rubber latices utilized in the emulsions of the present invention also may comprise a styrene-butadiene latex. A variety of styrene-butadiene latices are available commercially and are useable in the present invention. One example of a useful styrene-butadiene latex is SBR Latex FL-5202 which contains 70% solids and is available from Textile Rubber and Chemical Company.

In yet another embodiment, the rubber latex which is added to the emulsion may be a latex of butyl rubber which is the product of the copolymerization of isobutylene with a small amount of a diene such as isoprene and butadiene. Butyl rubber latices also are available commercially from a variety of sources.

In yet another embodiment, the rubber latex added to the emulsions of the present invention may be an acrylic latex. An example of a useful acrylic latex is Texigel 13-302 containing about 35% solids and is available from Scott Bader.

The following examples illustrate the blends utilized to prepare the water based coal tar emulsions of the present invention. The examples are presented for the purpose of illustration and are not to be considered as limiting. Unless otherwise indicated in the following examples, in the written description and in the appended claims, all parts and percentages are by weight, temperatures are in degrees centigrade, and pressure is at or near atmospheric pressure.

In all of the examples, a first mixture (oil phase) is prepared comprising the coal tar, the acrylonitrile-butadiene copolymer powder, plasticizer (DOP) and antioxidant (Wingstay L) when present. A second mixture is prepared (clay slip) comprising the water and clay, and the mixture is heated to a temperature of about 45° C. before adding to the oil phase which has been heated to a temperature of at least about 160° C. Upon further agitation, an emulsion is formed. After the emulsion is formed, antifreeze materials (propylene glycol or hexylene glycol) and a rubber latex may be added to the emulsion.

| Example 1 | wt (g) |
|---|---|
| Coal Tar R-11 | 400 |
| Chemigum P615D | 100 |
| Water | 500 |
| Clay (M&D) | 150 |

| Example 2 | |
|---|---|
| Coal Tar R-12 | 400 |
| Chemigum P615D | 88 |
| Chemigum P86F | 32 |
| DOP | 48 |
| Wingstay L | 12.6 |
| Water | 550 |
| Clay (Volunteer)) | 180 |
| Hexylene glycol | 40 |
| Chemigum Latex 248 | 75 |

| | Example (g) | | | | | | | |
|---|---|---|---|---|---|---|---|---|
| | 3 | 4 | 5 | 6 | 7 | 8 | 9 | 10 |
| Coal Tar R-12 | 400 | 400 | 400 | 400 | 400 | 400 | 400 | 432 |
| Chemigum P615D | 100 | 100 | 50 | 100 | 94 | 88 | 100 | 54 |

-continued

| | Example (g) | | | | | | | |
|---|---|---|---|---|---|---|---|---|
| | 3 | 4 | 5 | 6 | 7 | 8 | 9 | 10 |
| Chemigum P86F | 24 | 24 | 15 | 24 | 28 | 32 | 24 | 24 |
| DOP | 72 | 72 | 45 | 60 | 54 | 48 | 72 | 57 |
| Wingstay L | 12.6 | 12.6 | 2.5 | 12.6 | 12.6 | 12.6 | 12.6 | 2.7 |
| Water | 550 | 550 | 550 | 550 | 550 | 550 | 550 | 900 |
| Clay (Volunteer) | 180 | 180 | 160 | 170 | 180 | 180 | 180 | 174 |
| Propylene glycol | 40 | 40 | 40 | 40 | 40 | 40 | 40 | 42 |
| SBR Latex FL 5202 | 75 | 75 | 25 | 50 | 75 | 75 | 75 | 27 |

| | 11 | 12 |
|---|---|---|
| Coal Tar R-12 | 400 | 400 |
| Chemigum P615D | 100 | 100 |
| Chemigum P86F | 24 | 24 |
| Paraplex A-9000 | 72 | 72 |
| Wingstay L | 12.5 | 12.5 |
| Water | 550 | 550 |
| Clay (Volunteer) | 180 | 170 |
| Propylene glycol | 40 | 40 |
| Chemigum Latex 248 | 75 | 75 |
| Veegum granules | — | 3.3 |

| Example 13 | wt (g) |
|---|---|
| Coal Tar R-12 | 400 |
| Chemigum P615D | 88 |
| Chemigum P86F | 32 |
| DOP | 48 |
| Wingstay L | 12.6 |
| Water | 550 |
| Clay (Volunteer) | 180 |
| Propylene glycol | 40 |
| SBR Latex FL 5202 | — |

| Example 14 | |
|---|---|
| Coal Tar R-12 | 180 |
| Chemigum P615D | 90 |
| Chemigum P86F | 11 |
| Paraplex A-9000 | 32 |
| Wingstay L | 5.6 |
| Water | 576 |
| Veegum granules | 2.5 |
| Clay (Volunteer) | 76 |
| Propylene glycol | 18 |
| Aluminum (paste) | 73 |
| Chemigum Latex 248 | 77 |

The water based coal tar emulsions of the invention which are formed as described above have a solids content of greater than 50% and more often greater than 55%, and a viscosity as determined with a No. 5 spindle at 10 rpm in the range of from about 4000 cps to about 20,000 cps. The emulsion also may be characterized as sprayable, low odor, fire resistant and solvent free. The water based emulsions also will not attack or degrade styrofoam insulation. The coating and films produced by the emulsions are fire and water resistant, exhibit good adhesion to many surfaces, and retain elongation during weathering.

In one embodiment, the emulsions of the invention are free of water-insoluble organic amines. In other embodiments, the emulsions are free of sand and/or added silicone resins.

The coal tar emulsions are useful, in one embodiment, are useful as topcoatings for built-up roofing, water proofing and maintenance materials. The emulsions can be readily cold-applied to various substrates by techniques well known to those skilled in the art, and upon evaporation of the water, leave a flexible film having the usual advantages of coal tar such as water and bacteria resistance. The films formed from the emulsions of the invention exhibit superior properties which result from the modification of the coal tar with the acrylonitrile-butadiene copolymer powders, and optionally, the added rubber latex. Some of these property improvements include improved elongation and recovery characteristics, improved fatigue resistance, improved adhesive qualities, etc. The coal tar emulsions are useful particularly as a flood coat or maintenance treatment. The water based coal tar emulsions of the present invention also may be utilized as surface coatings for aged built-up roofs to restore waterproofing characteristics and to add surface life to the membranes. For example, the water based coal tar emulsions of the present invention are useful as a high performance surfacing bitumen for ASTM D450 Type I or Type III coal tar built-up membranes, as flood coats for new built-up roofing systems constructed with ASTM D312 asphalts, Types I through IV, and as maintenance topcoats for coal tar and aged asphalt roofs. The tensile properties of the films which are obtained from the water based coal tar emulsions of the present invention can be determined in accordance with ASTM method D2370-98. In one embodiment, the films obtained from the emulsions of the invention have an elongation of at least 200% after 60 days at 158° F. (70° C.).

The elongation and tensile characteristics of the films obtained with the water based coal tar emulsions of some of the above Examples is determined using the following laboratory procedure. Films are prepared from the emulsions which are about 50 mils thick, and these films are drawn down to about 20–25 mils. The drawn down films are allowed to cure at room temperature for at least 1 day. One half of each sample is allowed to continue to age at room temperature at about 50% relative humidity. The second half of each sample is subjected to a heat aging test in accordance with ASTM Method D573. These samples are placed in a forced air oven maintained at about 158° F. (70° C.). The tensile strength and elongation of the samples are determined after 10 days and about 30 days or more.

The results are summarized in the following table.

| Room Temp Film Properties | | | |
|---|---|---|---|
| Film from Example | Days | Tensile | Elongation (%) |
| 3 | 10 | 0.753 | 958 |
| 6 | 12 | 0.135 | 329 |
| 7 | 10 | 0.145 | 539 |
| 8 | 10 | 0.125 | 415 |
| 9 | 20 | 0.894 | 372 |
| 11 | 23 | 0.161 | 640.5 |
| 13 | 15 | 0.233 | 275 |

| | Heated Film Properties | | |
|---|---|---|---|
| Film from Example | Oven Days | Tensile | Elongation (%) |
| 6 | 13 | 0.569 | 498 |
|  | 33 | 0.957 | 360 |
| 7 | 9 | 0.876 | 301 |
|  | 21 | 1.447 | 246 |
| 8 | 9 | 0.62 | 412 |
|  | 21 | 1.142 | 450 |
| 9 | 22 | 0.772 | 610 |
|  | 61 | 1.024 | 434 |
| 11 | 22 | 0.774 | 284 |

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

What is claimed is:

1. A water-based coal tar emulsion prepared from the blend comprising, based on the total weight of said emulsion
   (a) from about 20% to about 60% by weight of coal tar;
   (b) from about 30% to about 60% by weight of water;
   (c) from about 3% to about 15% by weight of an acrylonitrile-butadiene copolymer powder; and
   (d) from about 5% to about 30% by weight of clay.

2. The emulsion of claim 1 wherein the coal tar has an overall float test of from about 50 seconds to about 220 seconds.

3. The emulsion of claim 1 wherein the blend comprises from about 15 to about 40% by weight of the acrylonitrile-butadiene copolymer, based on the weight of the coal tar.

4. The emulsion of claim 1 wherein the acrylonitrile-butadiene copolymer powder comprises a mixture of a linear acrylonitrile-butadiene copolymer and a crosslinked acrylonitrile-butadiene copolymer.

5. The emulsion of claim 4 wherein the acrylonitrile-butadiene copolymer mixture comprises from about 60% to about 85% of a linear acrylonitrile-butadiene copolymer and from about 15% to about 40% by weight of a crosslinked acrylonitrile-butadiene copolymer.

6. The emulsion of claim 1 wherein the acrylonitrile-butadiene copolymer comprises from about 20% to about 45% of acrylonitrile.

7. The emulsion of claim 1 wherein the acrylonitrile-butadiene copolymer comprises from about 25 to about 35% by weight of acrylonitrile.

8. The emulsion of claim 1 wherein the acrylonitrile-butadiene copolymer contains a partitioning agent.

9. The emulsion of claim 1 wherein the clay is a ball clay.

10. The emulsion of claim 1 also comprising from about 0.1 to about 2% by weight of an antioxidant.

11. The emulsion of claim 1 also comprising from about 0.1 to about 10% by weight of a plasticizer.

12. The emulsion of claim 1 also comprising from about 0.1 to about 5% by weight of an organic hydroxy or polyhydroxy compound.

13. The emulsion of claim 1 wherein a rubber latex is added to the emulsion after the blend is prepared.

14. The emulsion of claim 13 wherein the latex is a styrene-butadiene latex or an acrylonitrile-butadiene latex.

15. The emulsion of claim 1 also comprising from about 1% to about 8% by weight of aluminum powder.

16. A water-based coal tar emulsion prepared from a blend comprising, based on the total weight of the emulsion,
   (a) from about 20% to about 50% by weight of coal tar having an overall float test of from about 50 seconds to about 220 seconds;
   (b) from about 30% to about 60% by weight of water;
   (c) from about 5% to about 15% by weight of an acrylonitrile-butadiene copolymer powder mixture, said copolymer mixture comprising a linear acrylonitrile-butadiene copolymer and a crosslinked acrylonitrile-butadiene copolymer; and
   (d) from about 10% to about 30% by weight of clay.

17. The emulsion of claim 16 comprising from about 7 to about 15% by weight of the acrylonitrile-butadiene copolymer powder mixture.

18. The emulsion of claim 16 wherein the copolymer mixture comprises from about 60% to about 85% by weight of the linear copolymer and from about 15% to about 40% of the crosslinked polymer.

19. The emulsion of claim 16 wherein the acrylonitrile copolymers comprise from about 20 to about 45% by weight of acrylonitrile.

20. The emulsion of claim 16 wherein the acrylonitrile copolymers comprise from about 25 to about 35% by weight of acrylonitrile.

21. The emulsion of claim 16 wherein the acrylonitrile-butadiene copolymers contain a partitioning agent.

22. The emulsion of claim 16 wherein the clay is a ball clay.

23. The emulsion of claim 16 also comprising from about 0.1 to about 2% by weight of an antioxidant.

24. The emulsion of claim 16 also comprising from about 0.1 to about 10% by weight of a plasticizer.

25. The emulsion of claim 16 also comprising from about 0.1 to about 5% of a organic hydroxy or polyhydroxy compound.

26. The emulsion of claim 16 wherein a rubber latex is added to the emulsion after the blend is prepared.

27. The emulsion of claim 26 wherein the latex is a styrene-butadiene latex or an acrylonitrile-butadiene latex.

28. The emulsion of claim 16 also comprising from about 1% to about 8% by weight of aluminum powder.

29. A method of preparing a water-based coal tar emulsion which comprises:
   (a) preparing a first mixture comprising coal tar and at least one acrylonitrile-butadiene copolymer powder;
   (b) heating the mixture to a temperature of at least about 160° C.;
   (c) preparing a second mixture comprising water and clay;
   (d) heating the second mixture to a temperature of at least about 45° C.; and
   (e) adding the first mixture to the second mixture with agitation to form an emulsion.

30. The method of claim 29 wherein a rubber latex is added to the emulsion formed in (e).

31. The method of claim 29 wherein an antioxidant is included in the first mixture.

32. The method of claim 29 wherein a plasticizer is included in the first mixture or added to the emulsion formed in (e).

33. The method of claim 29 wherein an organic hydroxy or polyhydroxy compound is added to the emulsion formed in (e).

34. A method of preparing a water-based coal tar emulsion which comprises:
   (a) preparing a first mixture comprising from about 35 to about 60 parts by weight of coal tar and from about 6.5 to about 18 parts by weight of at least one acrylonitrile-butadiene copolymer powder;

(b) heating the mixture to a temperature of at least about 160° C.;

(c) preparing a second mixture comprising from about 45 to about 60 parts by weight of water and from about 15 to about 19 parts by weight of ball clay;

(d) heating the second mixture to a temperature of at least about 45° C.; and (e) adding the first mixture to the second mixture with agitation to form an emulsion.

35. The method of claim 34 wherein from about 5 to about 10 parts by weight of a rubber latex are added to the emulsion formed in (e).

36. The method of claim 34 wherein from about 0.2 to about 1.5 parts by weight of an antioxidant and about 4 to about 10 parts by weight of a plasticizer are included in the first mixture.

37. The emulsion of claim 34 wherein from about 3 to about 5 parts by weight of an organic hydroxy or polyhydroxy compound is added to the emulsion formed in (e).

38. The method of claim 34 wherein the acrylonitrile-butadiene copolymer powder in the first mixture comprises a mixture of a linear acrylonitrile-butadiene copolymer and a crosslinked acrylonitrile-butadiene copolymer.

39. The method of claim 34 wherein the first mixture is prepared by mixing the coal tar with a portion of the at least one acrylonitrile-butadiene copolymer, said mixture is heated to a temperature of at least about 160° C., and additional acrylonitrile-butadiene copolymer is added to the heated mixture while maintaining the temperature of the mixture at least about 160° C.

* * * * *